United States Patent [19]

McHenry

[11] Patent Number: 5,158,842

[45] Date of Patent: Oct. 27, 1992

[54] BATTERY TERMINAL CONNECTOR

[75] Inventor: Edwin J. McHenry, Gilbert, Ariz.

[73] Assignee: Acme Electric Corporation, Tempe, Ariz.

[21] Appl. No.: 858,676

[22] Filed: Mar. 27, 1992

[51] Int. Cl.$^5$ .............................................. H01M 2/26
[52] U.S. Cl. ..................................... 429/161; 429/211; 429/178
[58] Field of Search ............... 429/161, 178, 179, 211, 429/160

[56] References Cited

U.S. PATENT DOCUMENTS

| | | |
|---|---|---|
| 1,259,193 | 3/1918 | Ahlgren . |
| 1,324,426 | 12/1919 | Loudon . |
| 2,831,910 | 4/1958 | Bates .................................. 429/161 |
| 3,711,335 | 1/1973 | Daniel ................................. 429/161 |
| 3,753,783 | 8/1973 | Eberle ............................. 429/161 X |
| 4,646,430 | 3/1987 | Clarke ............................. 429/161 X |
| 4,800,142 | 1/1989 | Bish et al. ....................... 429/160 X |

Primary Examiner—Anthony Skapars
Attorney, Agent, or Firm—Pearne, Gordon, McCoy & Granger

[57] ABSTRACT

A battery terminal connector provides similar connector assemblies for electrodes of similar polarity. Each connector includes a U-shaped collector plate providing spaced and parallel flanges extending to spaced and parallel edges. U-shaped tabs are mounted on each electrode and provide legs which extend up along the outer sides of the associated flanges. Each leg provides an edge in alignment with the edge of the associated flange. An edge weld, extending lengthwise of the associated flange edge, connects the adjacent legs. In one embodiment, the legs are twisted so that their end edges extend lengthwise along the edge of the associated flange. In another embodiment, the legs are not twisted and engage the associated flange along the edge of the legs.

14 Claims, 4 Drawing Sheets

BATTERY TERMINAL CONNECTOR

BACKGROUND OF THE INVENTION

This invention relates generally to the structure of storage batteries of the electrochemical type, and more particularly, to a novel and improved terminal structure for connecting electrodes of similar polarity.

Prior Art

Typically, storage batteries of the electrochemical type have one or more cells which include a plurality of spaced electrodes of one polarity and a plurality of intermediate electrodes of the opposite polarity. Terminals interconnect the electrodes of each polarity, usually to a terminal post, so that two terminals of opposite polarity are provided for each cell.

In some instances, tabs are connected to each electrode and are bent together so that they can connect with a terminal post. Bending of the tabs places a strain on the tab to electrode joint, as well as increasing a likelihood of shorting to the electrode of opposite polarity.

To avoid the requirement for bending the tabs, collector plates are sometimes employed, which extend between the various tabs of a given polarity and connect such tabs to a terminal. The U.S. Pat. Nos. 1,259,193 and 1,324,426 illustrate such collector plates. In such patents, the collector plates are provided with openings sized and positioned so that tabs connected to the various associated electrodes extend into the openings where they are welded, or burned, to provide a good electrical connection. In these two patents the openings are rectangular in shape, as are the tabs.

It is also known to provide collector plates with a comb-like structure in which parallel slots extend in from one edge of the plate. These slots are positioned and sized so that the collector plate can be moved laterally over a plurality of electrode tabs so that one tab fits within each slot. Subsequently, the tabs are welded to the collector plate. Generally, the combs must be of thicker material than the tabs to carry the current from all of the tabs. This requires welding two items of widely different thicknesses, which is more difficult than welding items of substantially the same thickness, since the thin material melts faster than the thick material.

Further, the slots in the comb must be wider than the width of the tabs in order to allow assembly. This leaves a gap between the comb and the tabs, which requires more heat, and the melting of more material. This further increases the difficulty in welding materials of different thicknesses. Typically, many passes are required to weld the comb structure. Either each tab must be welded individually, or a number of passes must be made perpendicular to the tabs. Individual tab welding requires as many passes as there are tabs, and perpendicular welding wastes much heat and welds each tab in a number of spots rather than along its entire length.

Further, because all of the electrode tabs are connected along one edge of the collector plate, the entire cell current is required to flow from such edge to the terminal itself. This requires, in many instances, a relatively thick collector plate to provide sufficient current capacity.

SUMMARY OF THE INVENTION

The present invention provides a novel and improved terminal connection structure for electrochemical battery cells and the like which is economical to produce and reliable in operation. The terminal connector provides a simple connector plate which does not have any tab receiving slots or openings. Instead, the connector plate and tabs provide surface-to-surface contact in which the zones of contact are in alignment so that a single weld pass operates to provide an electrical connection between the collector plate and a plurality of electrode tabs.

Further, the thickness of the collector plate is preferably similar to the thickness of the tabs to reduce welding problems. This reduction in the thickness of the collector plate is made possible, in the illustrated embodiment, by providing two tabs on each electrode and connecting them to opposite sides of the collector plate. Therefore, each side of the collector plate carries only one-half of the total current.

In the illustrated embodiments, the collector plates are generally U-shaped and provide two spaced and parallel flanges. The tabs are also U-shaped and provide spaced and parallel legs. One leg of each tab fits against the associated flange and is welded to the associated flange. Therefore, two weld electrical connections are provided between each electrode and the collector plate. Further, the welding operation only requires two passes, one along each flange.

Two embodiments are illustrated. In one illustrated embodiment, the edge surface of the legs engages the associated flange. In the other illustrated embodiment, the legs are twisted through 90° so as to extend in contact along the length of the associated flange. This latter embodiment provides a longer and more reliable weld and is preferred in heavy duty applications, even though it requires a twisting operation during the manufacture of the tabs.

In both illustrated embodiments, the tabs and collector plates are sized and shaped so that the end edges of the tab legs are aligned with the edges of the associated flange of the collector plate. Connecting welds are formed along these aligned edges, where a minimum amount of heat is required to produce a reliable weld.

Although the two illustrated embodiments both provide a U-shaped collector plate and U-shaped tabs, it is within the broader aspects of this invention, particularly in light duty batteries, to provide L-shaped components and a single weld to connect each electrode to the collector plate.

These and other aspects of this invention are illustrated in the accompanying drawings and are more fully described in the following specification.

DETAILED DESCRIPTION OF THE DRAWINGS

Figure 1A:
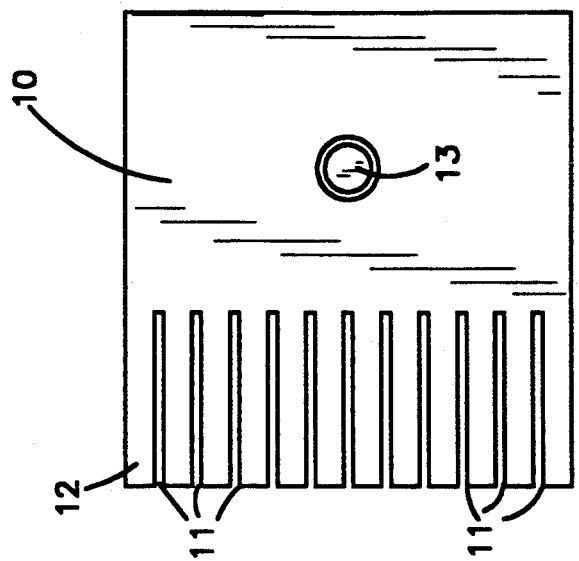
FIG. 1a is a plan view of the collector plate illustrated in FIG. 1 illustrating the arrangement of the slots which receive the tabs of the electrodes.
Figure 1:
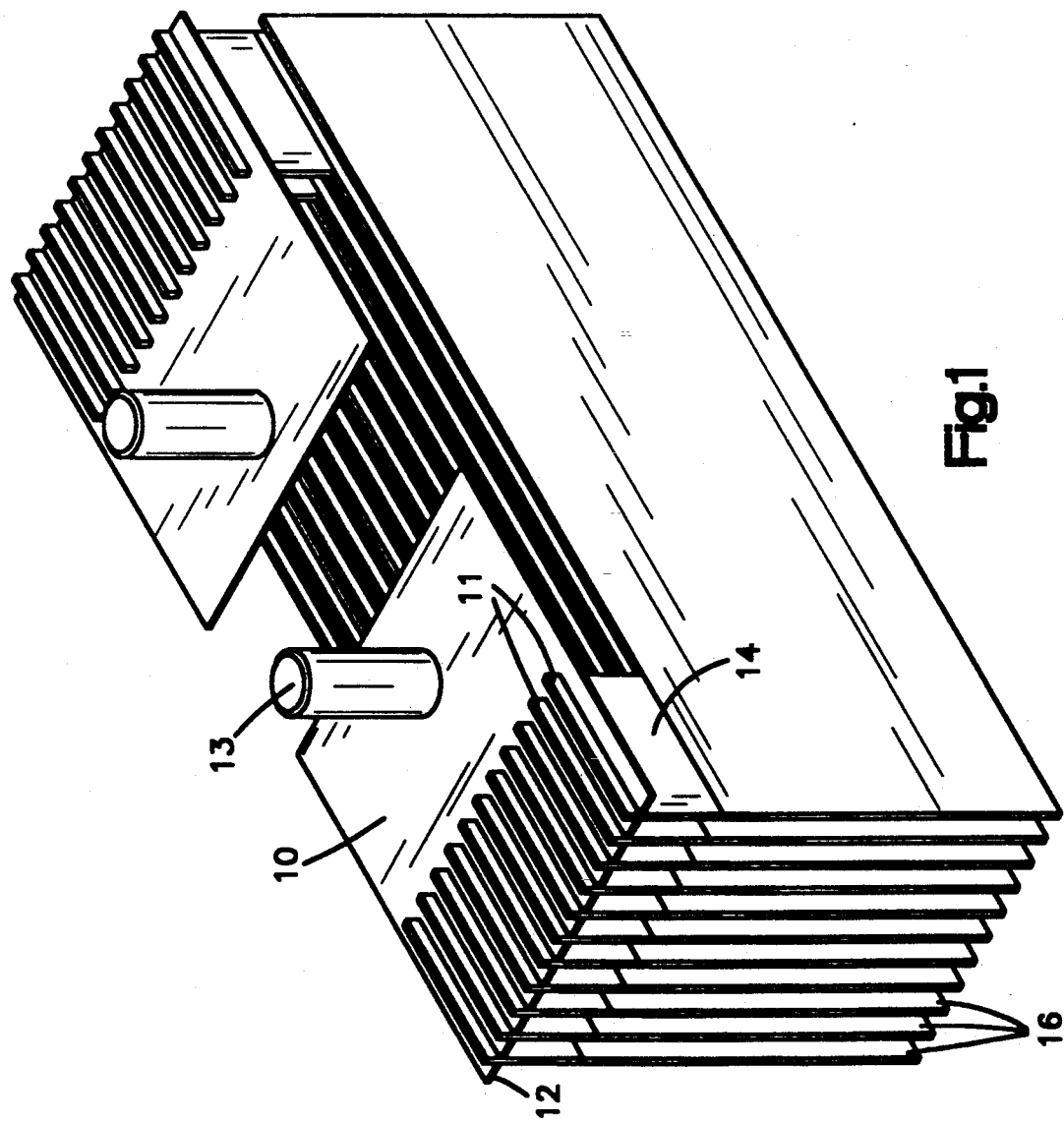
FIG. 1 is a fragmentary schematic perspective view of a prior art comb-type collector plate assembly which has been used to interconnect electrodes of similar polarity in typical storage batteries.

FIGS. 1 and 1a illustrate a prior art terminal connector structure which connects a plurality of electrodes of similar polarity to a common terminal. This connector, often referred to as a comb-type connector, provides a plate 10 having a plurality of parallel slots 11 extending inwardly from one edge 12. Also provided on the plate is a cylindrical terminal 13.

In a typical installation, a tab 14 extending laterally from each associated electrode 16 is positioned within one of the slots 11, as best illustrated in FIG. 1. Thereafter, tabs 14 are welded to the plate 10.

Because the plate 10 must carry the entire current of the cell from one side of the plate to the terminal, the plate must be relatively thick. Consequently, in most instances, the plate 10 of the comb is substantially thicker than the tabs 14 connected to the electrodes. Where two metals are of a substantially different thickness, it is difficult to effectively and reliably produce good welds.

Figure 3:
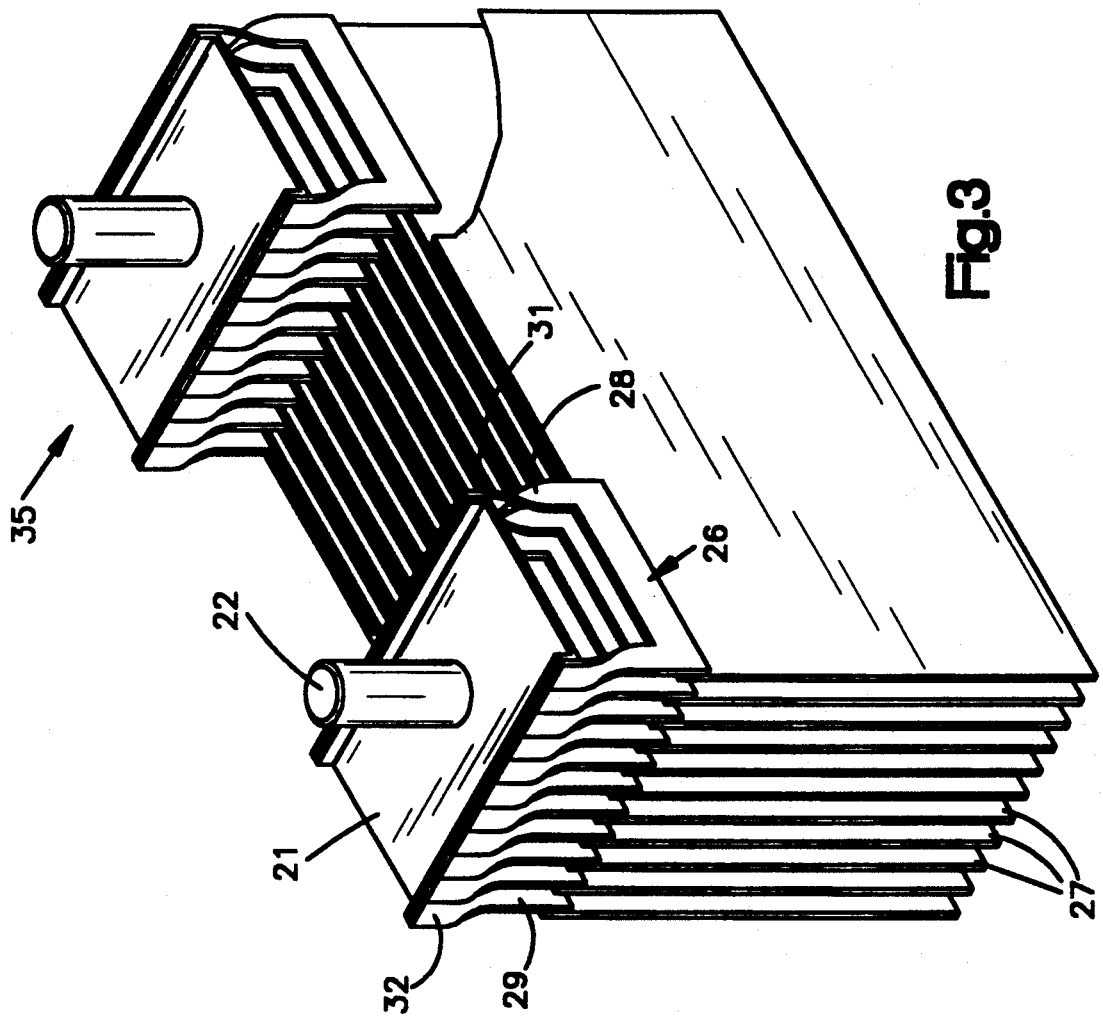
FIG. 3 is a schematic perspective view illustrating a completed unit in accordance with the first embodiment.
Figure 2:
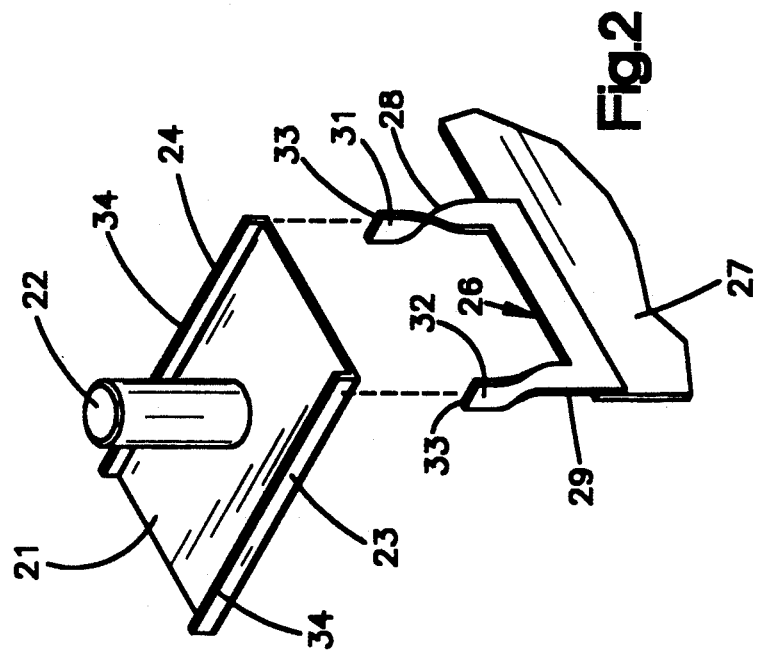
FIG. 2 is a fragmentary schematic exploded perspective illustrating the component parts of a first preferred embodiment of this invention.
Figure 4:
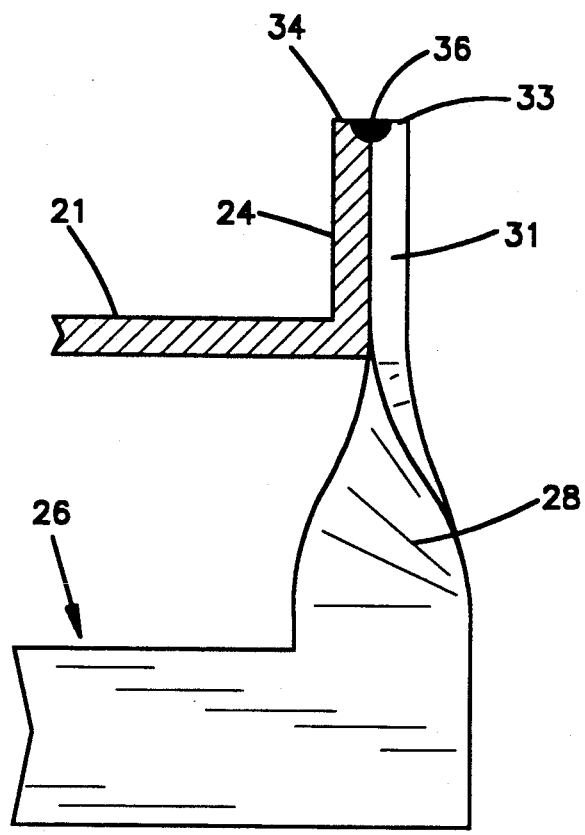
FIG. 4 is an enlarged fragmentary view illustrating the weld interconnecting the collector plate and the electrode tabs.

FIGS. 2-4 illustrate a first preferred embodiment of the present invention. In this embodiment, a U-shaped collector plate 21 is formed of sheet metal, such as nickel, and provides a centrally located cylindrical terminal 22. The collector plate provides two laterally spaced parallel and upstanding flanges 23 and 24.

In this embodiment, U-shaped tabs 26 are welded to the associated electrode 27 and provide two upstanding legs 28 and 29. The ends 31 and 32, respectively of the legs 28 and 29, are twisted through 90° so that they extend in a direction generally perpendicular to the plane of the electrodes 27 and parallel to the associated flange. These ends 31 and 32 are spaced apart the proper distance so that when assembled, as illustrated in FIG. 3, the ends 31 extend up along the exterior surface of the flange 24, and the ends 32 extend up along the outer surface of the flange 23.

The tabs may be formed of wire, such as nickel wire, which has been flattened to provide the illustrated width or can be cut from sheet metal, as desired. Preferably, the width of the ends 31 and 32 is equal to the spacing between adjacent electrodes of similar polarity so that when all of the electrodes of a given cell are assembled with an associated collector plate 21, the ends 31 and 32 are in substantial abutting engagement along the associated flanges 23 and 24. The tabs are also proportioned so that the upper edges 33 of the ends of the legs 28 and 29 are in alignment with the adjacent edges 34 of the associated flanges 23 and 24. Therefore, after the collector plates and tabs are assembled, it is merely necessary to complete the assembly by forming an edge weld 36, as best illustrated in FIG. 4, along the length of each of the flanges. A similar connector assembly 35 is provided to connect the intermediate plates of opposite polarity.

Because two legs and two welds are provided to connect each electrode with the opposite sides of the collector plate, the collector plate can be formed of thinner material than the collector plates of the comb-type illustrated in FIG. 1. This is because both sides of the collector plate are available for the conduction of the current to the terminal 22. Preferably, the thickness of the collector plate 21 is in the same order of magnitude as the thickness of the tabs. However, some variation in thickness does not produce any difficulty in producing the weld since the weld is formed along an edge and extends the full length of the flange. This first embodiment is preferred for heavy duty installations where two welds of substantial length are provided between each of the tabs and the collector plate.

Figure 7:
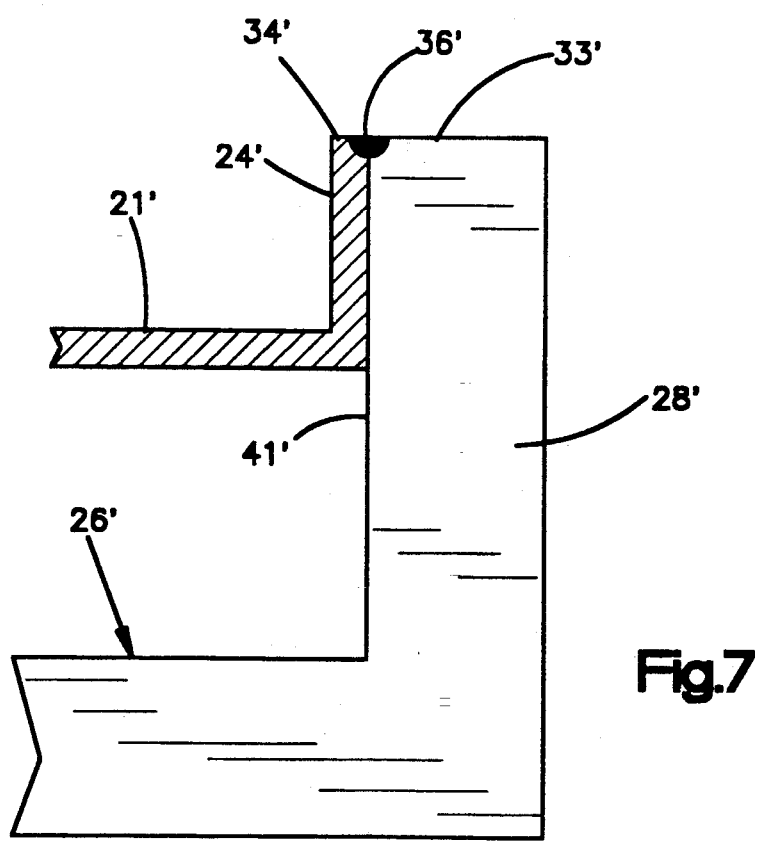
FIG. 7 is an enlarged fragmentary view illustrating the weld connecting the electrode tabs and the collector plate in the second embodiment of this invention.
Figure 6:
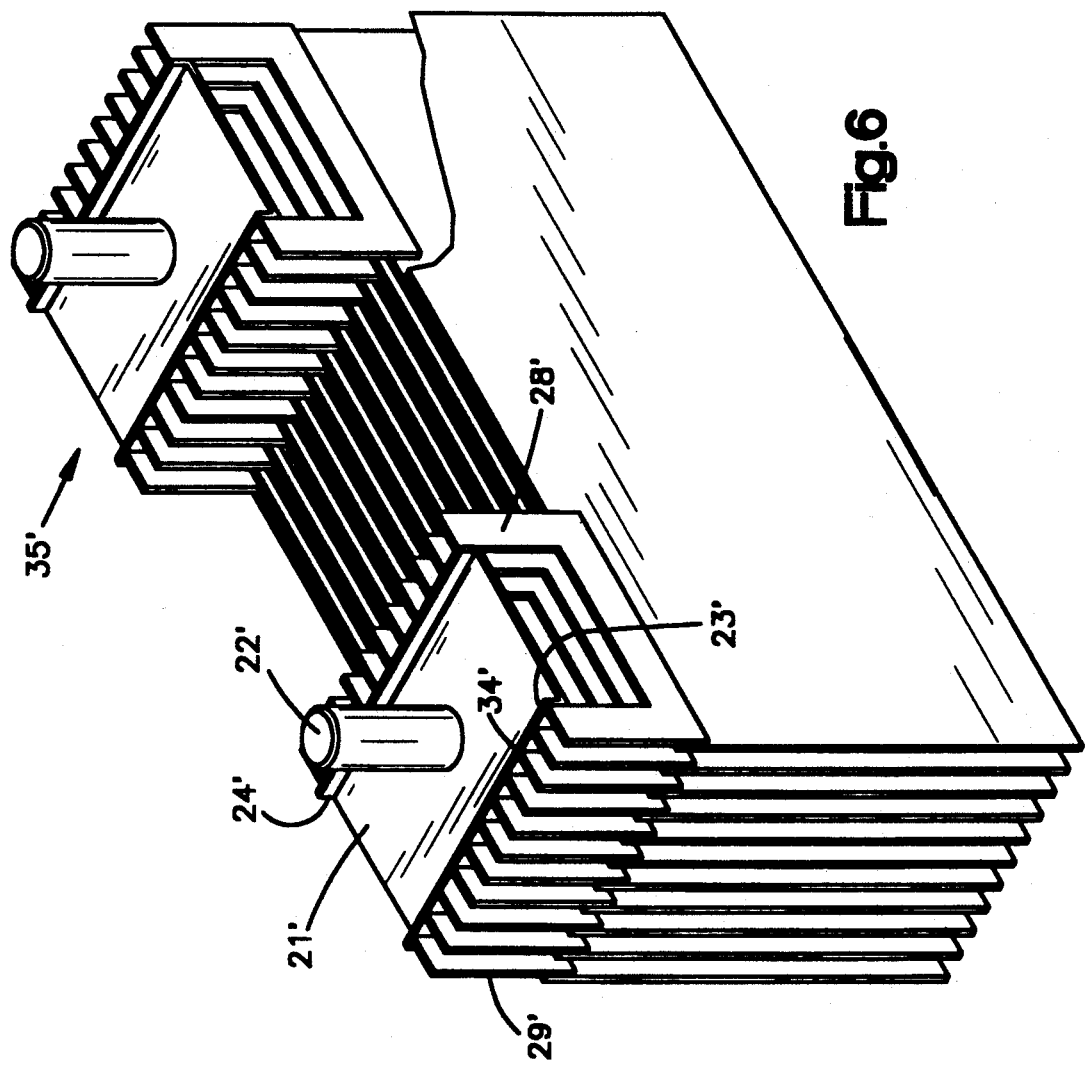
FIG. 6 is an assembly view similar to FIG. 3, but illustrating the structure in accordance with the second embodiment of this invention.
Figure 5:
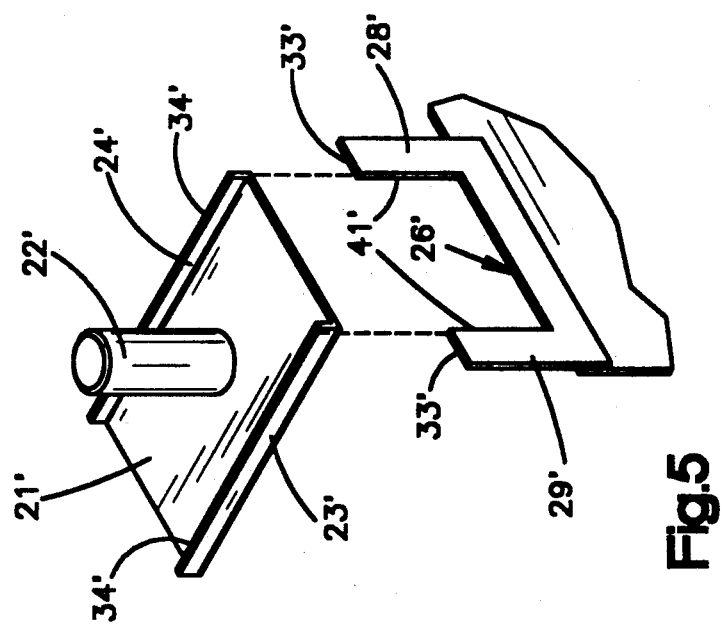
FIG. 5 is an exploded perspective schematic view similar to FIG. 2, but illustrating a second embodiment of this invention.

FIGS. 5-7 illustrate another preferred embodiment of this invention. In this embodiment, similar reference numerals are used to designate elements which are similar to the elements of the first embodiment, but a prime (') is added to indicate reference to the second embodiment.

Here again, the collector plate 21' is formed of sheet metal bent to a U-shape to provide two flanges 23' and 24'. Also, a cylindrical electrode 22' is welded to the collector plate 21' in a central location.

In this second embodiment, the tabs 26' are again formed with a U-shape, providing spaced and parallel legs 28' and 29'. In this instance, however, the legs are not twisted through 90° and are sized so that their inner edges 41' are spaced apart so as to extend up along the exterior surfaces of the associated flanges 23' and 24'. Further, the legs are sized so that their upper edges 33' are in alignment with the upper edges 34' of the two flanges 23' and 24'. A welded connection is provided by welding the abutting edges 33' and 34' at 36', as illustrated in FIG. 7. Because the two spaced welds 36' are provided between the collector plate 21' and the tabs 26', a very stable and reliable connection is provided. Further, because edges are welded to edges, variations in thickness between the edges 33 and 34 do not create any particular welding problem. Further, since both sides of the collector plate are available for conducting the current to the terminal 22', the collector plate of this embodiment can also be formed of thinner material than the collector plate of the prior art comb structure of FIG. A similar connector assembly 35' again connects the intermediate electrodes of opposite polarity.

Here again, all of the connections between a given collector plate and the associated electrodes within a given cell are formed by two welding passes, one along each edge of the collector plate, as illustrated in FIG. 7. Each of the welds 36' provides a good connection between the components of the connectors.

Although both of the illustrated embodiments utilize tabs of a U-shaped configuration in combination with a U-shaped collector plate, it is within the broader aspects of this invention, particularly in lighter duty applications, to use an L-shaped collector plate in combination with an L-shaped connector tab. The two L-shaped components would be proportioned and welded in a manner similar to one side of one of the illustrated embodiments. In such instance, only a single edge weld is provided between each tab and its associated collector plate.

Although the preferred embodiments of this invention have been shown and described, it should be understood that various modifications and rearrangements of the parts may be resorted to without departing from the scope of the invention as disclosed and claimed herein.

What is claimed is:

1. An electrochemical cell comprising a plurality of spaced electrode assemblies of similar polarity, said electrode assemblies each having a tab providing a leg extending substantially parallel to the leg of the other of said electrode assemblies, said legs having a connector surface extending along a single predetermined plane, a collector plate assembly providing a terminal and a substantially planar portion providing a planar surface extending along said predetermined plane engaging each of said connector surfaces, said legs and planar portions extending to align abutting edges, and an edge weld electrically connecting said connector surfaces and said planar surface.

2. A cell as set forth in claim 1, wherein each leg is twisted through substantially 90° to provide surface contact of substantial length with said planar surface, and said edge welds extend substantially the entire length of said edge of said planar surface.

3. A cell as set forth in claim 1, wherein each tab includes two spaced and parallel legs, and said collector plate is U-shaped and provides two spaced edge welds connected with each tab.

4. A connector assembly connecting electrodes of similar polarity comprising a plurality of electrode tabs each providing spaced first and second legs, said first legs each providing a first connector surface extending along a first plane, said second legs of said tabs each providing a second connector surface extending along a second plane, and a collector plate formed of sheet metal providing a third connector surface engaging said first connector surfaces and a fourth connector surface engaging said second connector surfaces, and first edge welds connecting said first and third surfaces and second edge welds connecting said second and fourth surfaces.

5. A connector assembly as set forth in claim 4, wherein said electrode tabs are U-shaped and said first and second planes are spaced and parallel, and said third and fourth connector surfaces are respectively co-planar with said first and second planes.

6. A connector assembly as set forth in claim 5, wherein said legs are twisted to provide planar end portions extending along the associated of said first and second planes.

7. A connector assembly as set forth in claim 6, wherein said electrodes of similar polarity are spaced apart a predetermined distance, and said end portions of said legs have a width substantially equal to said predetermined distance.

8. A connector assembly as set forth in claim 4, wherein said legs are generally planar, and said legs extend along planes substantially perpendicular to the associated of said third and fourth connector surfaces.

9. A connector assembly connecting a plurality of electrodes of similar polarity comprising a U-shaped collector plate having a substantially uniform thickness, said collector plate providing a central portion providing a terminal and first and second substantially parallel flanges along opposite edges of said central portion, said flanges extending to substantially parallel edges, and a plurality of U-shaped electrode tabs each providing spaced and substantially parallel first and second legs, said first legs extending along said first flange and providing edges aligned with said edge of said first flange, said second legs extending along said second flange and providing edges aligned with said edge of said second flange, and edge welds joining said edges of said first flange and first legs and joining said edges of said second flange and said second legs.

10. A connector assembly as set forth in claim 9, wherein said legs have planar ends, and said planar ends extend substantially perpendicular to the associated of said flanges.

11. A connector assembly as set forth in claim 9, wherein said legs have planar ends extending substantially parallel to the associated of said flanges.

12. A connector assembly as set forth in claim 11, wherein said planar ends of said legs extend lengthwise of the associated flanges into substantial abutting engagement.

13. A battery cell comprising first electrodes of a first polarity, intermediate electrodes of opposite polarity, electrode tabs each providing two spaced and parallel legs extending to end edges, a first U-shaped collector plate connecting the legs of said electrode tabs of electrodes of said first polarity, a second similar U-shaped collector plate connecting the legs of said electrode tabs of electrodes of said opposite polarity, each of said collector plates providing spaced and substantially parallel flanges with edges aligned with the edges of associated legs, and a weld extending along each edge of each flange joining each flange with the associated edges of the associated legs.

14. A battery cell as set forth in claim 13, wherein said legs are twisted to provide area contact between each leg and its associated flange.

* * * * *